Jan. 7, 1969  A. E. TOBEY  3,420,010

AIR-COOLED TIRE ABRADING RASP

Filed April 25, 1966

INVENTOR.
ALTON E. TOBEY
BY
ATTORNEYS

United States Patent Office 3,420,010
Patented Jan. 7, 1969

3,420,010
AIR-COOLED TIRE ABRADING RASP
Alton E. Tobey, 2203 Mission St.,
Santa Cruz, Calif. 95060
Filed Apr. 25, 1966, Ser. No. 544,887
U.S. Cl. 51—356                         2 Claims
Int. Cl. B24b 55/02

ABSTRACT OF THE DISCLOSURE

A rasp for abrading tire carcasses to prepare the same for recapping is described which is designed in such a manner to be automatically air cooled. The rasp comprises a rotatable circular disc having a plurality of circumferentially spaced slots extending radially into the outer periphery thereof. A pair of annular abrading elements are concentrically secured respectively to each side face of the disc adjacent the periphery of it and overlying the slots. These elements having abrading surfaces on their exposed side faces and as the rasp is rotated, air is entrained within the slots and flows radially outward due to centrifugal force. This air contacts the inner side faces of the annular elements and conducts heat directly therefrom.

---

This invention relates to tire rasps of the type employed in the abrading of tire carcasses for purposes of recapping, and the like, and is more particularly directed to an air cooled tire rasp.

Tire rasps are extensively employed by tire recappers to abrade the surfaces of tire carcasses to provide a surface quality that is suited to the capping process. Since substantial heat is generated in the abrading operation which tends to soften the abraded surface and be detrimental to the abrading action of the rasp, various arrangements have been devised to facilitate air cooling of the abrading surface. Heretofore, however, air cooled rasps have been relatively complex and difficult to manufacture.

Therefore, it is an object of the present invention to provide an air cooled rasp of relatively simple design adapted to ready manufacture.

Another object of the invention is to provide an air cooled rasp having a highly effective cooling action.

A further object of the invevntion is the provision of an air cooled rasp of the class described having cooling passages with a minimized tendency toward clogging by the abraded material.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1:
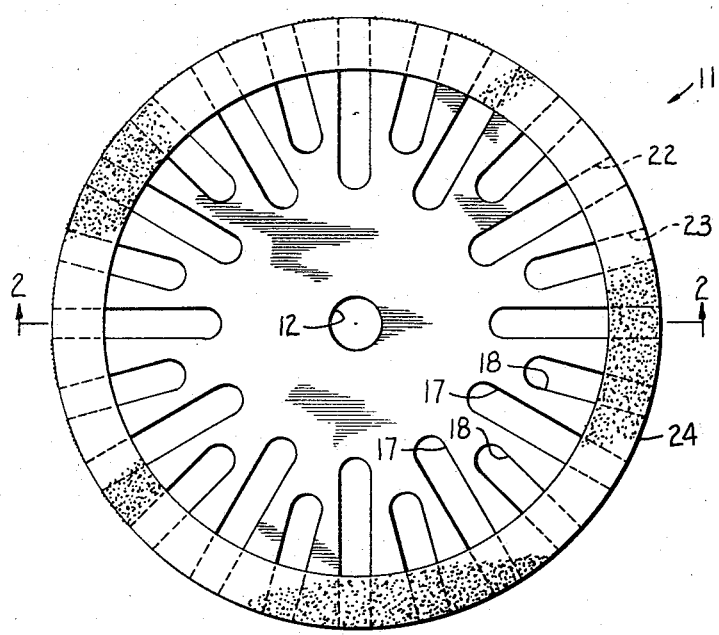
FIGURE 1 is a side elevational view of a preferred form of rasp in accordance with the present invention.

Considering now the invention in some detail, and referring to the illustrated forms thereof in the drawing, an air cooled rasp in accordance with the present invention will be seen to generally comprise a circular disc having a peripheral abrading surface and provided with a plurality of circumferentially spaced slots extending radially into the abrading surface. As the disc is rotated on a motor driven shaft, or the like, to continuously move the abrading surface across the surface of a tire carcass, substantial heat is normally generated by friction. However, with the instant rasp, rotation of the disc also causes air to be swept into the slots and to be centrifugally forced radially outward therethrough past the abrading surface. Such flow of air is highly effective in cooling the abrading surface to maintain same at a relatively low temperature. As a result, the abrading operation is conducted without detriment due to heat softening of the abraded surface. It is particularly important to note that the rasp structure by which air cooling of the abrading surface is effected is extremely simple and capable of being readily manufactured. Furthermore, the air flows through the slots at relatively high velocity by centrifugal force such that clogging of the slots by the abraded material is substantially prevented.

Figure 2:
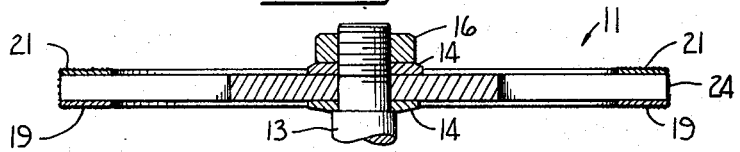
FIGURE 2 is a sectional view taken at line 2—2 of FIGURE 1, depicting the rasp in a hub assembly.
Figure 3:
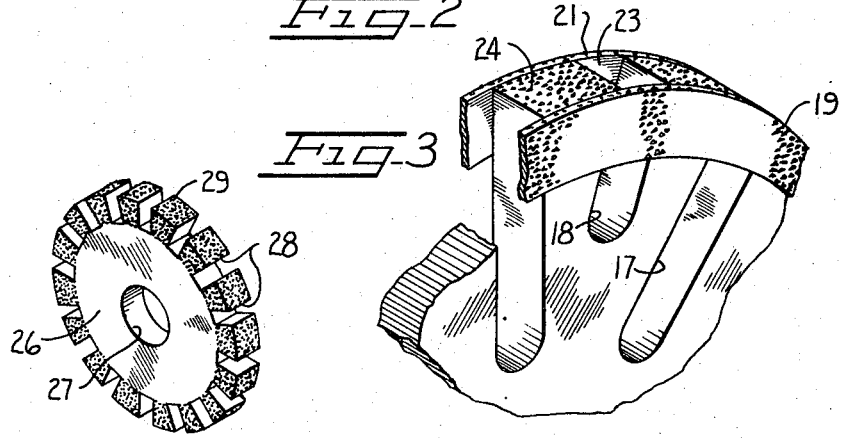
FIGURE 3 is a fragmentary perspective view with portions broken-away of the rasp.

Referring to FIGURES 1–3 in particular, a preferred form of rasp in accordance with the present invention as outlined above will be seen to include a circular disc 11 of metallic material such as brass, or the like. The disc is provided with an axial bore 12 for traversal by a shaft 13, the disc being secured thereto as by means of washers 14 and a nut 16 to form a rasp hub assembly. The shaft is typically coupled to an electric motor (not shown) for driven rotation.

The disc is provided with alternating pluralities of circumferentially spaced slots 17, 18 extending radially inward from the disc periphery. The slots 17 are relatively long while the slots 18 are relatively short for the purpose of structural strength. In this regard, since the slots are alternately long and short, a substantial amount of the disc material is provided between any two adjacent slots. Such arrangement is of particular importance with large diameter discs in order to provide a large number of closely spaced slots while retaining adequate structural rigidity.

A pair of annular elements 19, 21 are concentrically secured to the respective side faces of the disc adjacent the periphery thereof, the peripheries of the annular elements being flush with the disc periphery. The slots 17, 18 extend radially inward beyond the annular elements such that the inner ends of the slots are laterally open, whereas their outer ends are laterally closed by the annular elements. The slots 17, 18 thus terminate outwardly in cooling passages 22, 23. The side faces and peripheries of the elements 19, 21 and periphery of the disc are coated, or otherwise provided with an abrasive material, as indicated at 24, so as to define the abrading surface of the rasp. The annular elements 19, 21, of course, provide an abrading surface of extended area since they bridge the slots and provide surface thereacross.

With the rasp construction just described, rotation of the disc causes air to be entrained into the slots 17, 18 and then be centrifugally swept radially outward through the passages 22, 23. Such flow of air cools the adjacent portions of the disc and annular elements 19, 21, to thus maintain the abrading surface of the rasp relatively cool.

Figure 4:
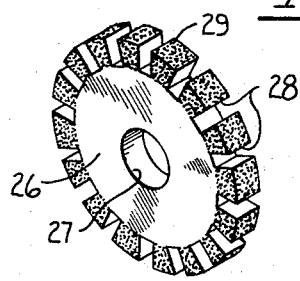
FIGURE 4 is a perspective view of a modified form of rasp.

A modified construction of air cooled rasp in accordance with the present invention is illustrated in FIGURE 4. Such construction is particularly applicable to rasps of small diameter. More particularly, in this case the rasp comprises a circular disc 26 having a central bore 27 to facilitate connection to a motor driven shaft, and a plurality of circumferentially spaced relatively shallow slots 28 extending radially into the periphery thereof. The periphery of the disc and portions of the side faces thereof immediately adjacent the periphery are provided with abrasive material, as indicated at 29, to define the abrading surfaces of the rasp. Here again, as the disc 26 rotates, air is entrained into the slots 28 and centrifugally forced radially outward to provide cooling of the abrading surface.

What is claimed is:
1. A tire abrading rasp comprising a rotatable circular disc having a plurality of circumferentially spaced slots extending radially into the periphery thereof, a pair of annular abrading elements concentrically secured respectively to each side face of said disc adjacent the periphery thereof and overlying said slots, said elements having abrading surfaces on their exposed side faces.
2. A tire abrading rasp according to claim 1, further defined by said slots being alternately relatively long and relatively short and extending radially inward beyond said annular elements.

References Cited

UNITED STATES PATENTS

| | | | |
|---|---|---|---|
| 2,755,601 | 7/1956 | Lux | 51—206.3 X |
| 2,819,568 | 1/1958 | Kasick | 51—356 |
| 2,857,671 | 10/1958 | Nelson | 51—207 X |
| 3,162,187 | 12/1964 | Christenson | 51—206 X |
| 3,203,140 | 8/1965 | Hallez | 51—206 |

FOREIGN PATENTS 403,159  12/1933  Great Britain.

ROBERT C. RIORDON, *Primary Examiner.*

D. G. KELLY, *Assistant Examiner.*

U.S. Cl. X.R.

29—78; 51—358, 206